United States Patent
Almog et al.

(10) Patent No.: US 10,248,993 B2
(45) Date of Patent: Apr. 2, 2019

(54) SYSTEMS AND METHODS FOR GENERATING PHOTO-REALISTIC IMAGES OF VIRTUAL GARMENTS OVERLAID ON VISUAL IMAGES OF PHOTOGRAPHIC SUBJECTS

(71) Applicant: Optitex Ltd., Rosh Ha'ayin (IL)

(72) Inventors: Gil Almog, Raanana (IL); Dror Revach, Yavne (IL)

(73) Assignee: OPTITEX LTD., Rosh Ha'ayin (IL)

( * ) Notice: Subject to any disclaimer, the term of this patent is extended or adjusted under 35 U.S.C. 154(b) by 438 days.

(21) Appl. No.: 15/079,974

(22) Filed: Mar. 24, 2016

(65) Prior Publication Data

US 2016/0284017 A1 Sep. 29, 2016

Related U.S. Application Data

(60) Provisional application No. 62/137,849, filed on Mar. 25, 2015.

(51) Int. Cl.

| | |
|---|---|
| *G06T 17/00* | (2006.01) |
| *G06Q 30/06* | (2012.01) |
| *G06T 7/60* | (2017.01) |
| *G06K 9/62* | (2006.01) |
| *G06T 15/00* | (2011.01) |
| *H04N 7/18* | (2006.01) |

(52) U.S. Cl.
CPC ....... *G06Q 30/0643* (2013.01); *G06K 9/6215* (2013.01); *G06T 7/60* (2013.01); *G06T 15/00* (2013.01); *G06T 2207/30124* (2013.01); *G06T 2207/30196* (2013.01); *H04N 7/18* (2013.01)

(58) Field of Classification Search
None
See application file for complete search history.

(56) References Cited

U.S. PATENT DOCUMENTS

| | | | | | |
|---|---|---|---|---|---|
| 6,307,568 | B1* | 10/2001 | Rom | ................ | G06T 19/00 345/629 |
| 7,149,665 | B2* | 12/2006 | Feld | ................ | A41H 3/007 703/2 |
| 10,007,978 | B2* | 6/2018 | Zhao | ................ | G06T 11/00 |
| 10,008,039 | B1* | 6/2018 | Neustein | ........... | G06T 19/006 |
| 2009/0115777 | A1* | 5/2009 | Reyers Moreno | .... | A41H 1/02 345/419 |

(Continued)

*Primary Examiner* — Martin Mushambo
(74) *Attorney, Agent, or Firm* — Daniel J. Swirsky; AlphaPatent Associates Ltd.

(57) ABSTRACT

The disclosure herein relates to systems and methods for generating photo-realistic quality images of a virtual garment super imposed on a visual image associated with a specific photographic subject using three-dimensional virtual components. The pattern making system operable to make virtual garments is configured to reduce the need to work with physical samples for branding agents. The three-dimensional component includes a garment simulation engine which realistically represents fabric and may virtually drape a garment on a three-dimensional avatar. Furthermore, the current disclosure is operable to automate the process of capturing images of a photographic subject in various poses, a fashion model for example, using various digital technologies associated with visual images for generating virtual photo-shoots.

20 Claims, 12 Drawing Sheets

(56) References Cited

U.S. PATENT DOCUMENTS

| | | | |
|---|---|---|---|
| 2010/0111370 A1* | 5/2010 | Black | G06K 9/00369 382/111 |
| 2013/0113789 A1* | 5/2013 | Suzuki | G06T 19/006 345/419 |
| 2014/0249961 A1* | 9/2014 | Zagel | G06K 9/00369 705/26.61 |
| 2014/0368499 A1* | 12/2014 | Kaur | G06T 19/20 345/420 |
| 2015/0106241 A1* | 4/2015 | Lucido | G06Q 30/0643 705/27.2 |
| 2015/0130795 A1* | 5/2015 | Chhugani | G06T 19/20 345/419 |
| 2016/0012626 A1* | 1/2016 | Shuster | G06K 9/62 382/111 |
| 2016/0155186 A1* | 6/2016 | Su | G06Q 30/0643 705/27.2 |
| 2016/0292779 A1* | 10/2016 | Rose | G06F 3/017 |
| 2016/0335807 A1* | 11/2016 | Lee | G06T 19/00 |
| 2017/0004568 A1* | 1/2017 | Radner | G06Q 30/0643 |
| 2017/0046769 A1* | 2/2017 | Jackson | G06Q 30/0643 |
| 2017/0287060 A1* | 10/2017 | Choi | G06F 3/002 |
| 2017/0316617 A1* | 11/2017 | Jeong | G06T 7/74 |
| 2017/0345089 A1* | 11/2017 | Wu | G06Q 50/22 |
| 2017/0352091 A1* | 12/2017 | Chen | G06T 19/20 |
| 2017/0352092 A1* | 12/2017 | Mitchell | G06T 15/503 |
| 2017/0372515 A1* | 12/2017 | Hauswiesner | G06T 17/00 |
| 2018/0018729 A1* | 1/2018 | Grimes | G06Q 30/0631 |

* cited by examiner

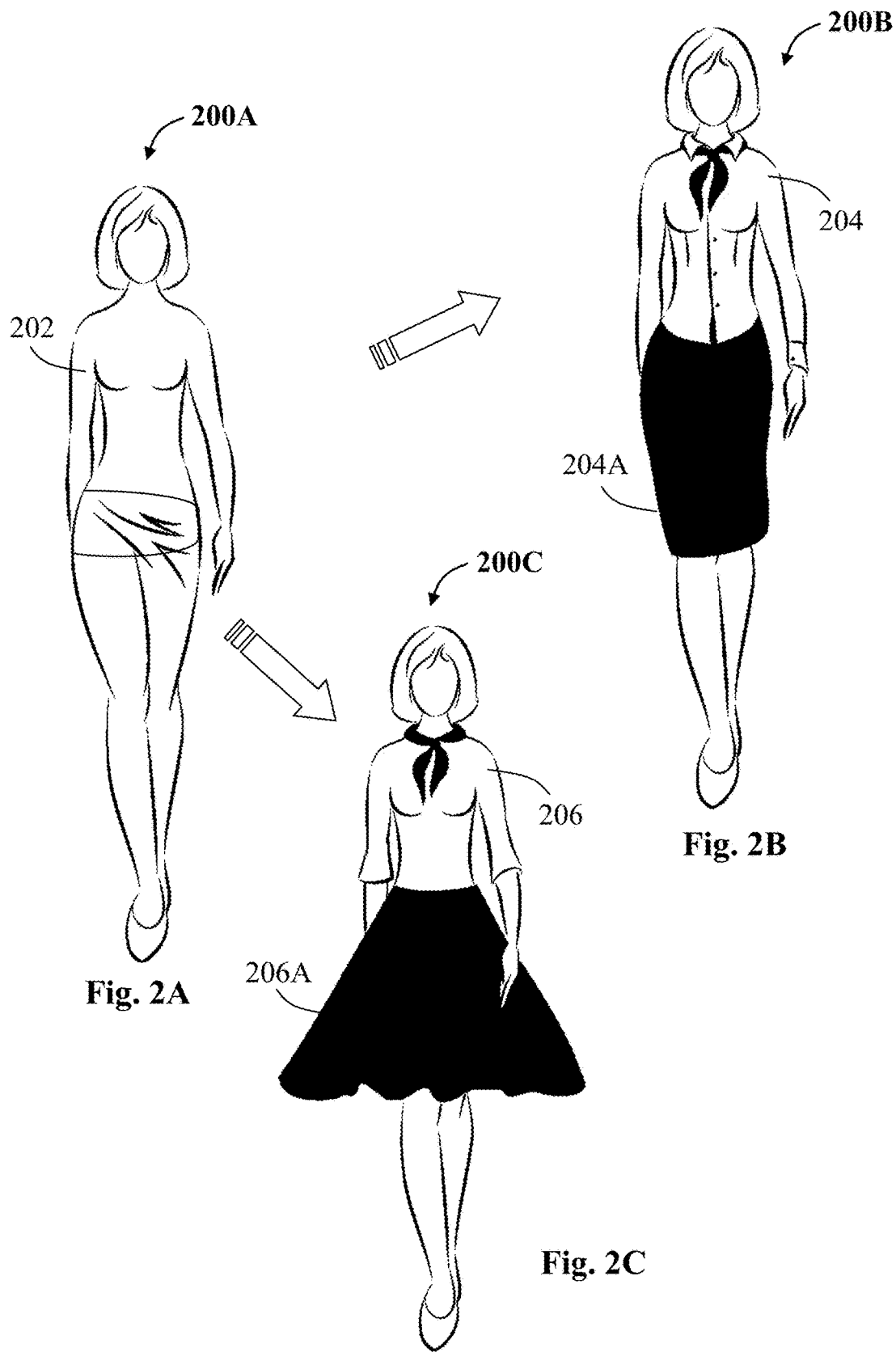

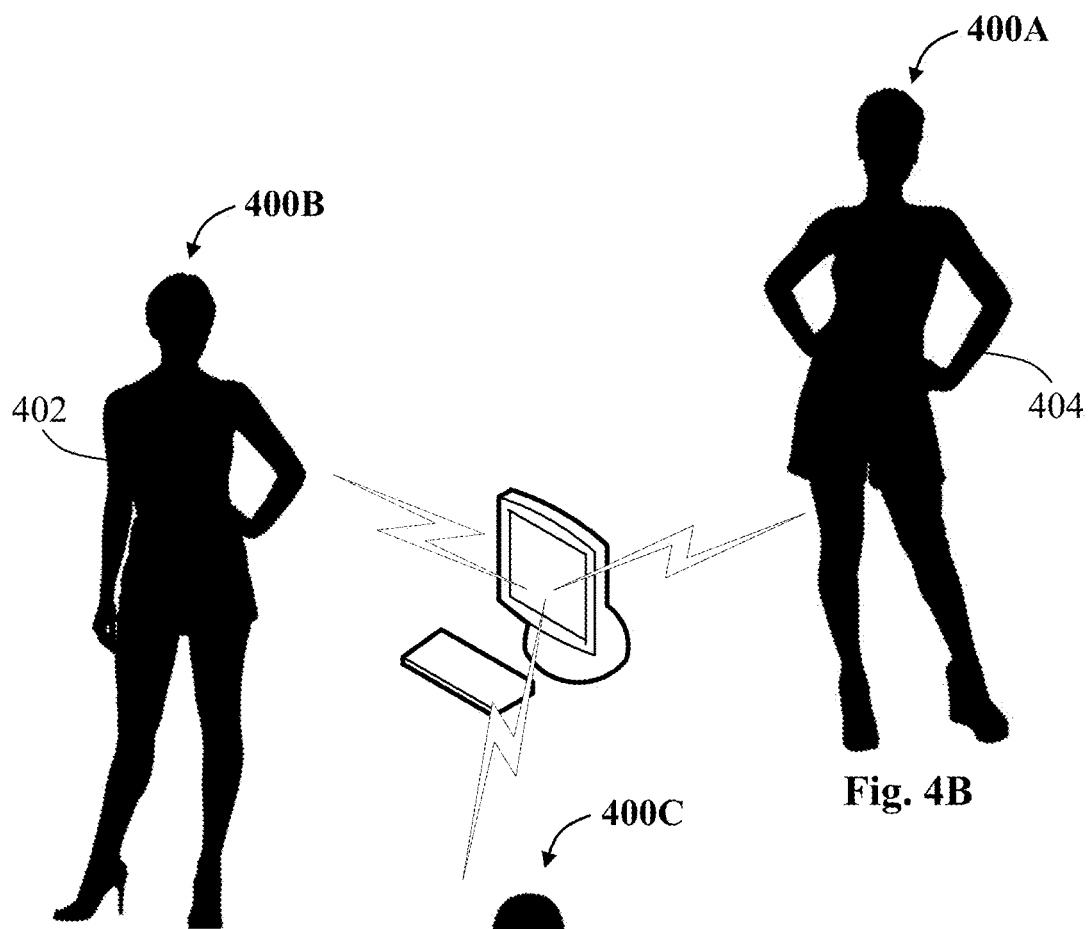
Fig. 4A
Fig. 4B
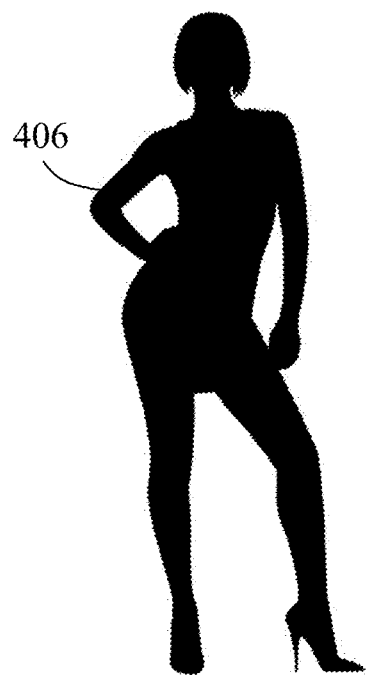
Fig. 4C

SYSTEMS AND METHODS FOR GENERATING PHOTO-REALISTIC IMAGES OF VIRTUAL GARMENTS OVERLAID ON VISUAL IMAGES OF PHOTOGRAPHIC SUBJECTS

CROSS-REFERENCE TO RELATED APPLICATIONS

This application claims the benefit of priority from U.S. Provisional Patent Application No. 62/137,849, filed Mar. 25, 2015, the contents of which are incorporated by reference in their entirety.

FIELD OF THE INVENTION

The disclosure herein relates to systems and methods for generating virtual photo-shoots. In particular, the disclosure herein relates to systems and methods for generating photo-realistic quality images of a virtual garment superimposed on a visual image associated with a specific photographic subject using three-dimensional virtual components.

BACKGROUND OF THE INVENTION

Systems for pattern making and three-dimensional virtual products offer a way for branding agents to reduce the need to work with physical samples. The three-dimensional component includes a cloth simulation engine which realistically represents fabric and can virtually drape clothing on three-dimensional avatars.

The main value proposition of such systems is the ability to reduce the need for physical samples and to work with virtual products through the design, product development and approval processes. The use of virtual products in the online marketing works may be promoted by automating the creation of 360-turntable images, which are snapshots of the three-dimensional product taken around the product that create the effect of the product rotating.

In order to enhance the visual appeal of the products, systems and methods may be offered, possibly via a service, and later on as a product integration combined with the ability to render the virtual products into photo-realistic quality. This could make the images of the product look true-to-life.

One of the roadblocks to such adoption is that most branding agents want to present their products with live photographic subject, such as fashion models. The photography of fashion models is used to advertise and sell products, where almost every branding agent uses fashion model photography for some portion of their products, and some branding agents use it for all the products in a collection.

Thus, the need remains, for the generation of photo-realistic quality images of virtual products on the photographic subject.

The disclosure herein addresses the above-described needs.

SUMMARY OF THE INVENTION

According to one aspect of the disclosure a method is taught for generating a photo-realistic quality image of a virtual garment overlaid on a visual image of a photographic subject in a pose, the method comprising:
capturing the visual image of the photographic subject, the visual image representing the photographic subject in the pose; creating a customizable avatar representing the photographic subject in the pose according to the visual image; making a virtual garment fitting the customizable avatar; generating an avatar anchoring set, the avatar anchoring set containing at least two positioning points selected from the visual image; generating a garment anchoring set, the garment anchoring set containing at least two positioning points selected from the virtual garment; and superimposing the virtual garment over the visual image using digital visual processing technique by matching corresponding positioning points from the avatar anchoring set and the garment anchoring set, wherein the visual image is selected from a group consisting of: a photographic picture, a video session comprising a plurality of photographic picture frames and combinations thereof.

As appropriate, the step of creating a customizable avatar comprises: capturing a plurality of body measurements of the photographic subject; applying a parametric avatar mechanism configured to read the plurality of body measurements; and creating the customizable avatar parametrically using the plurality of body measurements.

As appropriate, the step of creating a customizable avatar comprises: performing a three-dimensional scan operable to output a scanning result; applying a market automated solution configured to read the scanning result; and creating the customizable avatar.

As appropriate, the step of creating a customizable avatar comprises: creating a plurality of customizable avatars, each said customizable avatar is associated with one of said plurality of photographic picture frames of said video session using rigging technology; said frame comprises one photographic picture.

As appropriate, the step of creating a customizable avatar further comprises: wherein the rigging technology is operable to provide a skeleton of joints applied to each of the customizable avatar in each frame representing the photographic subject in a different pose.

As appropriate, the method further comprises: preparing an associated three-dimensional scene to facilitate matching with the visual image of the photographic subject.

Optionally, the step of preparing an associated three-dimensional scene comprises: selecting a configurable environment to match the environment associated with the photographic picture, the environment characterized by a background image and lighting conditions; loading the configurable environment; and loading the customizable avatar representing the photographic subject in the pose as appearing in the visual image.

Optionally, the step of preparing an associated three-dimensional scene, comprises: selecting a configurable environment to match the environment associated with each photographic picture frames of the video session, and the environment characterized by a background image and lighting conditions; loading said plurality of photographic picture frames associated with the video session; loading the configurable environment; and loading the customizable avatar associated with each plurality of photographic picture frames of the video session.

As appropriate, the step of loading is performed automatically upon selection of the video session.

As appropriate, the step of making a virtual garment, comprises: loading at least one two-dimensional pattern representing the virtual garment being prepared; performing virtual stitching of the two-dimensional pattern into the virtual garment; positioning the two-dimensional patterns adjacent to the customizable avatar in the three-dimensional scene; setting the virtual garment parameters according to a selected fabric; selecting the at least two positioning points from the virtual garment to enable the step of superimposing; and performing garment simulation on the visual image associated with the photographic subject.

As appropriate, the step of performing garment simulation is automatically triggered for each of a plurality of photographic picture frames associated with the video session.

Variously, the digital visual processing technique is selected from a group consisting of image processing technique and video processing technique.

As appropriate, the image processing technique, comprises: grabbing the visible portion of the virtual garment; performing photo-realistic rendering on the virtual garment; creating a visibility mask associated with the virtual garment; and superimposing the photo-realistic rendering result through the visibility mask onto the visual image of the photographic subject.

As appropriate, the video processing technique is automatically repeating the image processing technique for each of the plurality of photographic picture frames associated with the video session.

Variously, the photographic subject is selected from a group consisting of: a fashion-model, a statue, a building, a mannequin, an inanimate object and combinations thereof.

As appropriate, the step of creating a customizable avatar, further comprising: filming the video session of the photographic subject using motion capturing technology operable to determine photographic subject body movements; and translating the photographic subject body movements into a three-dimensional animation sequence.

According to another aspect of the disclosure, a pattern design system is presented for generating a photo-realistic quality image of a virtual garment, the system comprising: a processor operable to execute a software application for virtual garment design and operable to communicate with a repository comprising a plurality of visual images; an avatar generator engine operable to generate a customizable avatar matching a photographic subject in a pose captured in said visual image; a garment simulation engine operable to realistically represents fabric and virtually drape garment on the customizable avatar; and a compositing engine operable to enable superimposing the virtual garment over the visual image using a digital visual processing technique, and wherein the visual image is selected from a group consisting of: a photographic picture, a video session comprising a plurality of photographic picture frames and combinations thereof.

Variously, the digital visual processing technique is selected from a group comprising image processing technique, video processing technique and combinations thereof.

Where required, the compositing engine is further operable to enable superimposing the virtual garment over the visual image by matching at least two corresponding positioning points from an avatar anchoring set and a garment anchoring set.

Where required, the avatar generator engine may further be operable to use a measurement technique applied to the photographic subject, the measurements technique is selected from a group comprising a body measurements technique, a three-dimensional scanning technique and motion capturing technique.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIGS. 2A-C are representations of a fashion model image before and after applying image processing and simulation techniques to superimpose the virtual garment and to achieve a realistic quality image;

FIGS. 4A-C are illustrations of three different captured images of fashion models in a pose, retrieved from the image repository for futuristic creation quality superimposed images;

FIG. 5 is an illustration of a fashion model in a sequence of poses enabling generating a virtual video photography presenting various sequences of a performance such as of a dancing video clip, modeling performance and the like;

DETAILED DESCRIPTION OF THE INVENTION

Figure 1:
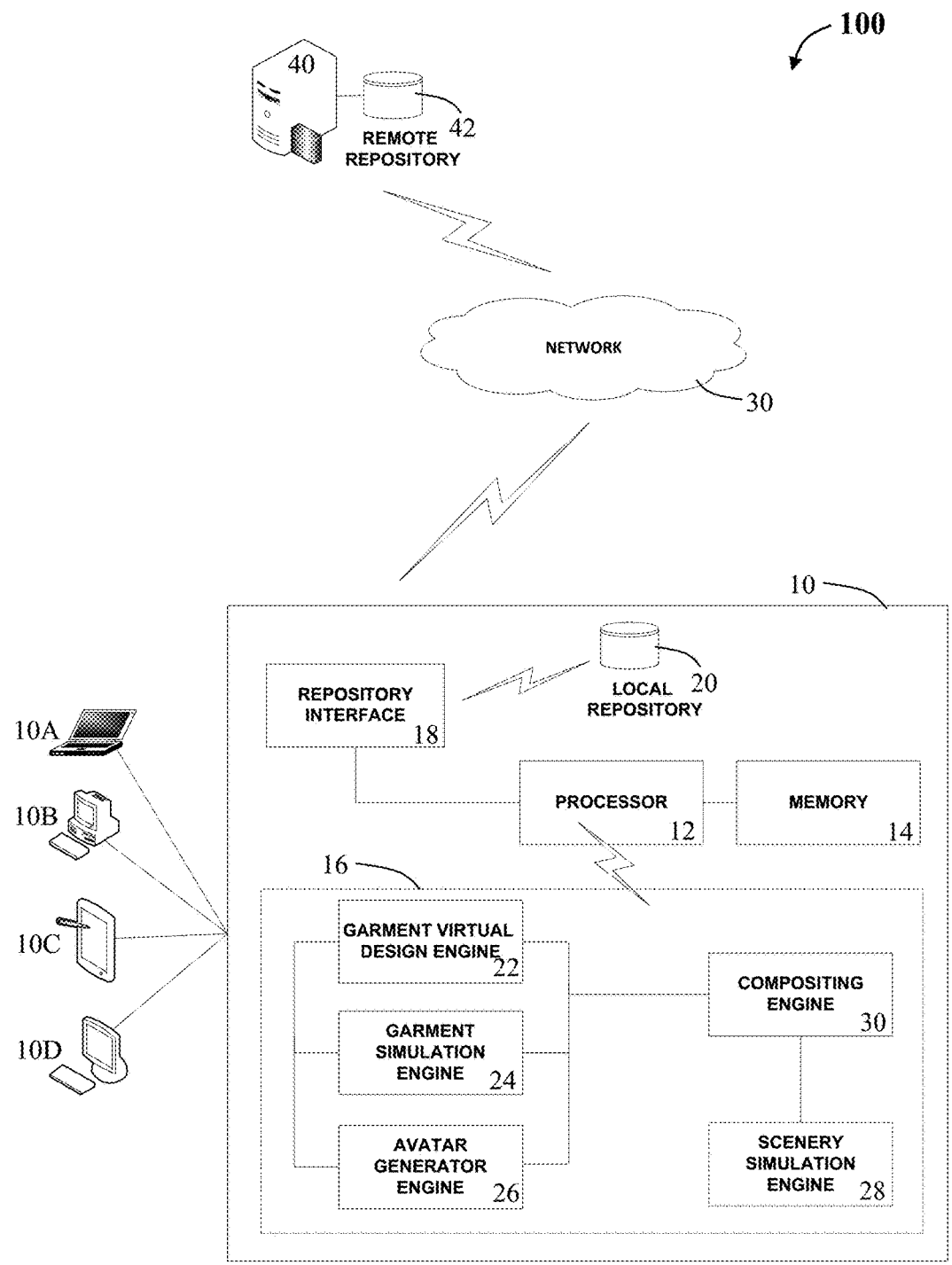
FIG. 1 is a block diagram of a pattern design system for generating virtual photo-shoots to provide photo-realistic quality image of a virtual garment using virtual components and visual processing techniques.

Aspects of the present disclosure relate to systems and methods for generating photo-realistic quality images of with a virtual garment super imposed on a visual image associated with a specific photographic subject using three-dimensional virtual components. The pattern making system operable to make virtual garment is configured to reduce the need to work with physical samples for branding agents. The three-dimensional component includes a garment simulation engine which realistically represents fabric and may virtually drape a garment on a three-dimensional avatar.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

As used herein, the term "visual image" may refer to a photographic picture of a photographic subject. Additionally or alternatively, the term "visual image" may refer to a video session. The video session may comprise a plurality of photographic picture frames, each picture frame being a still image. Displaying frames in quick succession creates the illusion of motion.

The measurement of frames per second (fps) is a measure of how much information is used to store and display motion video. The more frames per second (fps), the smoother the motion appears. The term applies equally to film and video cameras, computer graphics and motion capture systems.

Description of the Embodiments

It is noted that the embodiments shown hereinafter, such as the configuration in FIG. 1, for example, is shown by way of example for illustrative purposes only, and is not intended to be necessarily limiting.

System Architecture:

Reference is now made to FIG. 1, there is provided a block diagram of a pattern design system (PDS), which is generally indicated at 100, for generating virtual photo-shoots to provide photo-realistic quality image of a virtual garment, superimposed on a visual image, using virtual components and visual processing techniques. The pattern design system 100 consists of a computing device 10 comprising a processor 12 operable to execute a dedicated software design application 16 operable to perform virtual garment design and processing and in communication with a local repository 20 via a repository interface 18.

The computing devices 10 may be selected from a list comprising a various devices such as a laptop computer 10A, a personal computer 10B, a tablet computer 10C, a terminal 10D and the like. Accordingly, for a distributed system, the repository interface 18 may communicate with a remote repository 42 associated with a remote computing device 40, accessible via a communication network 30 such as the Internet from any of the computing devices described hereinabove.

The dedicated software design application 16 associated with the pattern design system 100 comprises a virtual garment design engine 22 operable to design and generate a virtual garment with the desired two-dimensional patterns. The pattern design system 100 further comprises a garment simulation engine 24 operable to provide design functionality of a virtual garment and perform simulation over a representation customizable avatar of the virtual garment, an avatar generator engine 26 operable to create the customizable avatar according to dimensions of the photographic subject in a pose and a compositing engine 30 operable to superimpose the virtual garment over a visual image associated with a photographic subject.

As appropriate, the avatar generator engine 26 is operable to use a various measurement techniques applied to the photographic subject. Such measurement technique may use body measurements technique, a three-dimensional scanning technique and the like. When the visual image is associated with a video session, motion capturing technique is used.

Further, the superimposing may be automatically operable by generating corresponding anchoring sets of positioning points selected from the virtual garment and from the visual image or avatar. The anchoring sets of positioning points may comprise at least two positioning points associated with the visual image and at least two positioning points associated with the virtual garment. Accordingly, positioning points from the avatar anchoring set may be matched to corresponding positioning points from the garment anchoring set.

Optionally, the pattern design system 100 comprises a scenery simulation engine 28 operable to provide a three-dimensional scene identical to the scene as appearing in the original visual image of the photographic subject. The associated environment, lighting conditions and background image, is part of the three-dimensional scene. When the conditions and camera angle are exactly the same between the original photography and the three-dimensional scene, the end result of superimposing the virtual garment looks natural as if the garment was photographed together with the photographic subject.

It is noted that visual processing technique may use image processing techniques when the visual images are photographic still pictures. Additionally or alternatively video processing techniques may be used for filming a video session of a photographic subject.

Thus, using such a system may enable a branding agent to develop a database or "library" of photographic subjects, such as fashion models. Each photographic subject may be photographed in various poses, and then reuse these images for virtual photo-shoots, reducing photography costs as well as cutting the time needed to produce the images.

As illustrated in FIGS. 2A-C, there is provided various views of a fashion model in a pose representing a photographic subject, to show the process of applying photo-realistic quality images of virtual products, such as a superimposing a virtual garment on a live fashion model captured image.

Reference is now made to FIG. 2A, there is provided a view of a fashion model captured image, which is generally indicated at 200A, the fashion model is pictured with a set of underwear clothing prior to applying the associated image processing and simulation techniques of virtual garment of FIGS. 2B-C to achieve the desired realistic quality image.

The fashion model 202 may represent one of many possible pictures of a live fashion model(s), captured in advance and stored in a repository such as presented in FIGS. 2A-C, for example. Each picture may show a live fashion model with a set of underwear, for example, being in a different pose, possibly with a different hair style, different expressions and the like, as may be accustomed in the fashion industry.

Reference is now made to FIG. 2B, there is provided a view of a captured image of a fashion model, which is generally indicated at 200B, the live fashion model pictured is presented with one possible virtual garment superimposed using image simulation/manipulation techniques.

Reference is now made to FIG. 2C, there is provided a view of a fashion model captured image, which is generally indicated at 200C, the live fashion model pictured is presented with another possible virtual garment superimposed using image simulation/manipulation techniques.

It is noted that the processed image of fashion model 204 in FIG. 2B is the same fashion model image 202 in FIG. 2A in the same pose and environment as presented in FIG. 2A, superimposed with the product of a generated virtual garment 204A. Similarly, the processed image of fashion model 206 in FIG. 2C is the same fashion model 202 of FIG. 2A in the same pose and environment as presented in FIG. 2A, superimposed with the product of a generated virtual garment 206A.

It is noted that the process of superimposing the virtual garments, makes use of applying image processing in a similar environment of the original picture, by loading the same background image, and providing the same lighting effects.

Figure 2D:
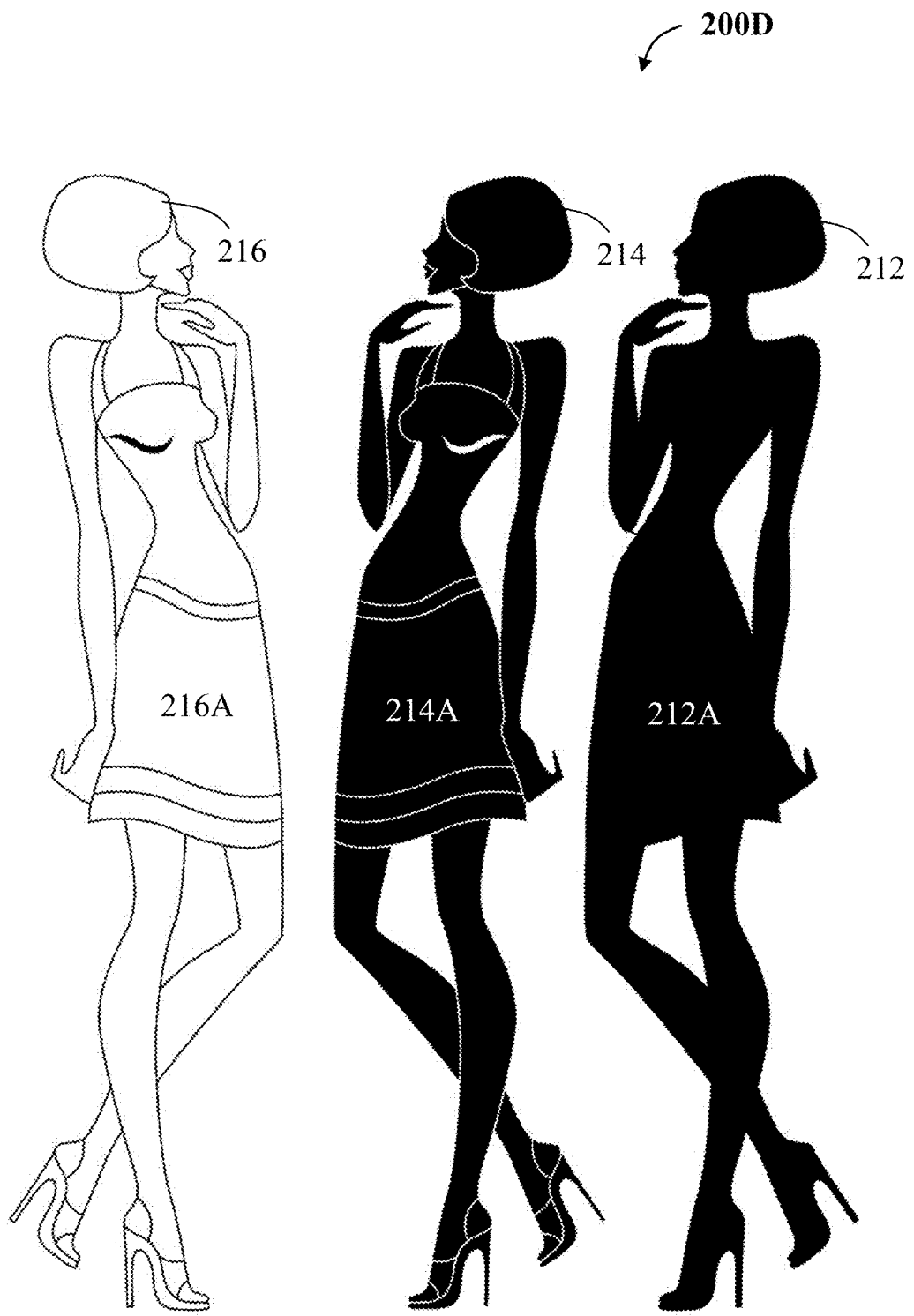
FIG. 2D is a representation of a fashion model in one pose presented in different views each and with a different garment.

Reference is now made to FIG. 2D, there is provided a representation of a fashion model, which is generally indicated at 200D, in one pose presented in different views each with a different garment.

The representation 200D shows different view of a fashion model 212, 214 and 216 in one pose, where in each pose the fashion model is dressed in a different garment 212A, 214A and 216A.

Image Repository:

Pictures and photography sequences, serving for the virtual photo-shoots and video animation may be generated as a separate process and stored in an image repository, which may be locally connected to a computing device or accessible remotely via an external network (see FIG. 1).

It is noted that the when the lighting conditions and camera angle are exactly the same between the original visual images stored in the repository and the three-dimensional generated scene, the end result looks natural as if the garment was photographed together with the photographic subject. Using such a system and method a branding agent may develop a database or "library" of photographic subjects, such as fashion models each photographed in several poses. The visual image is captured once, and then reused for virtual photo-shoots, reducing photography costs as well as cutting the time needed to produce the desired images.

Figure 3:
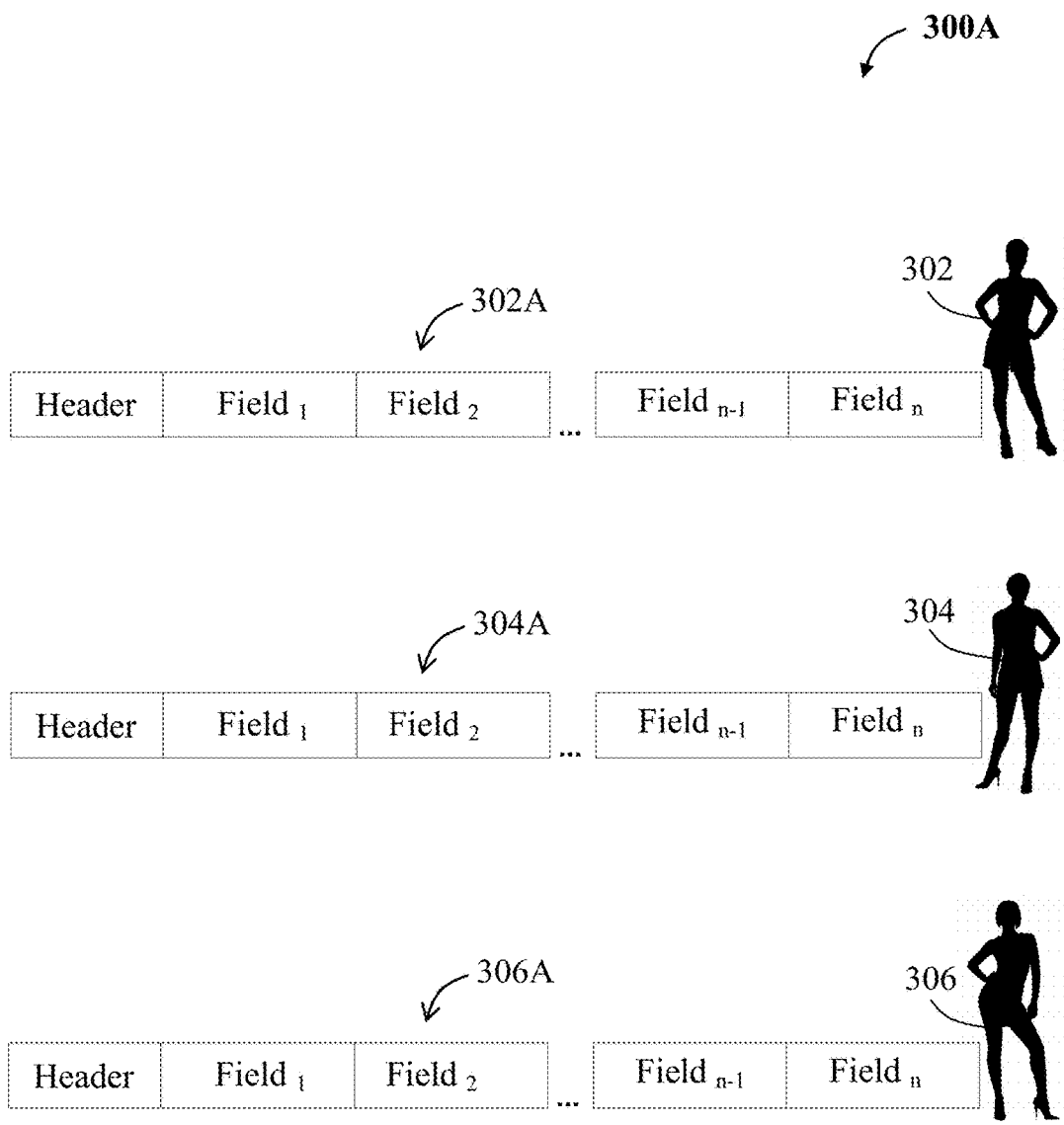
FIG. 3 is a repository structure presentation of stored photographic subject images to enable retrieval of visual images to generate photo-realistic quality images of virtual products.

Reference is now made to FIG. 3, there is provided a repository block diagram, which is generally indicated at 300A, for storing photographic subject images to enable performing virtual photo-shoots for providing photo-realistic quality images of virtual products.

Each photographic subject, such as the fashion model is kept in the image repository with associated records including the relevant data in separate fields for the specific photographic subject, possibly identified by an access key.

Accordingly, FIGS. 4A-C represent various images of fashion model(s), which is generally indicated at 400A-C. The fashion model images may be captured in a separate filming session, for example, and stored in the image repository (remote or local, as indicated in FIG. 1). Thereafter, the images may be retrieved from the image repository, presented on a display selectable for performing the virtual photo-shoot image process using image processing techniques and superimposing the desired virtual garment onto the original captured image.

It is noted that the set of images may be associated with one fashion model, for example, in different poses. Additionally or alternatively, the pictures may variously be associated with different fashion models. The presented image repository includes, for example, three different captured images (FIG. 4A-C) of different fashion models 402, 404 and 406, each in a pose for futuristic usage of creating quality superimposed images.

It is specifically noted that the image repository may be created as a separate process and updated as needed. Further, a photograph may be retrieved from the pictures' repository to perform a virtual photo-shoot for a photo-realistic quality superimposed picture. Thus, a branding agent may use virtual products and present realistic pictures with live fashion models.

Figure 5:
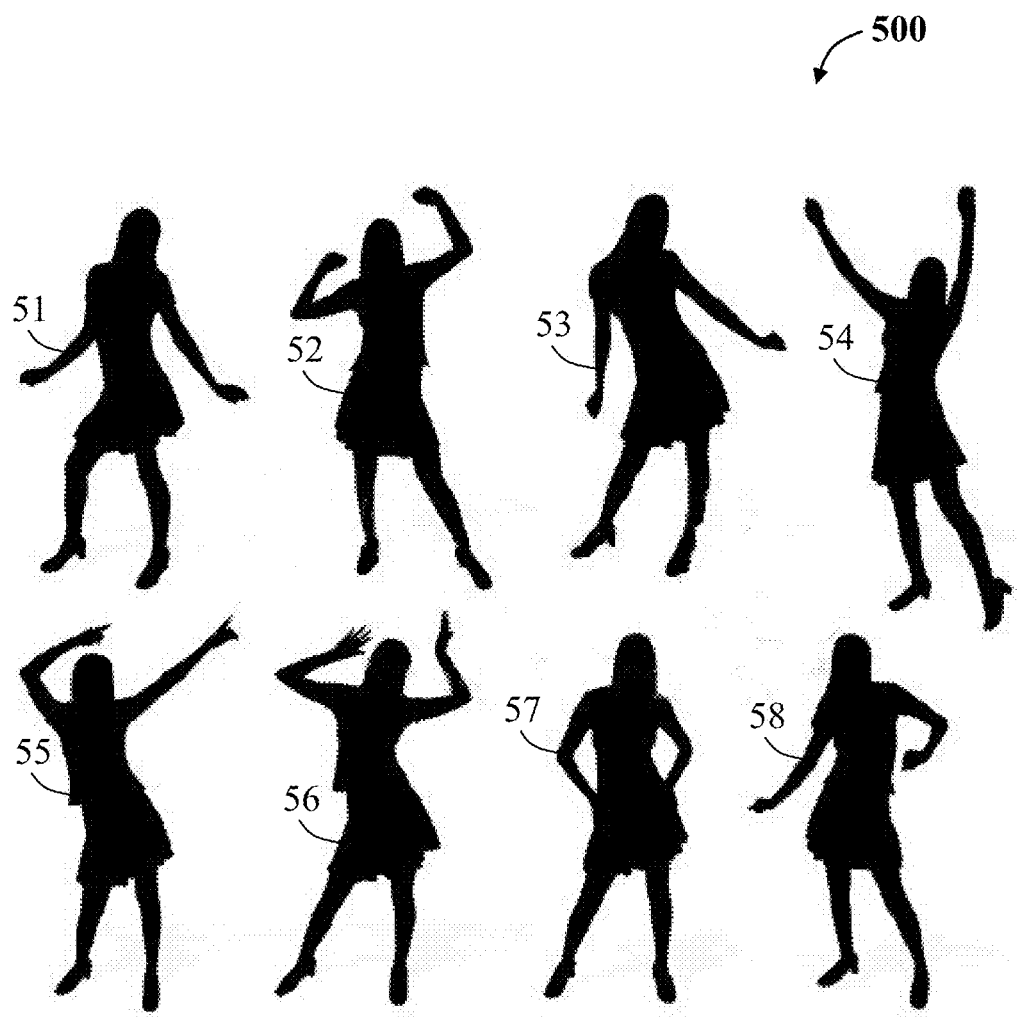

Reference is now made to FIG. 5, there is provided a fashion model/dancer in a sequence of poses, which is generally indicated at 500, for enabling virtual video photography presenting various sequences of a performance such as of a dancing video clip, modeling performance and the like.

For example, the video photography of various sequences may present such as a fashion model performing a "catwalk", natural walking, turning, running, sitting and the like. The system is then operable to create comparable animation sequences for the avatars. The cloth simulation supports animations so it's possible to create virtual videos that may show the fashion model performing a pre-recorded walking or running sequence "dressed" in the virtual garment.

It is noted that the video photography sequences may be recorded as a separate process and stored in a repository for use with futuristic fashion.

Possible Solutions:

Aspects of the present disclosure relate to systems and method of providing virtual photo-shoots and virtual video animation. Various system architectures and methods are operable to provide solutions for generating of photo-realistic quality images of using virtual products on photographic subjects such as a fashion-model, a statue, a building, a manikin, an inanimate object and the like.

Accordingly, FIGS. 6A-D represent various methods of possible solutions to provide generation of photo-realistic quality images using virtual products.

Figure 6A:
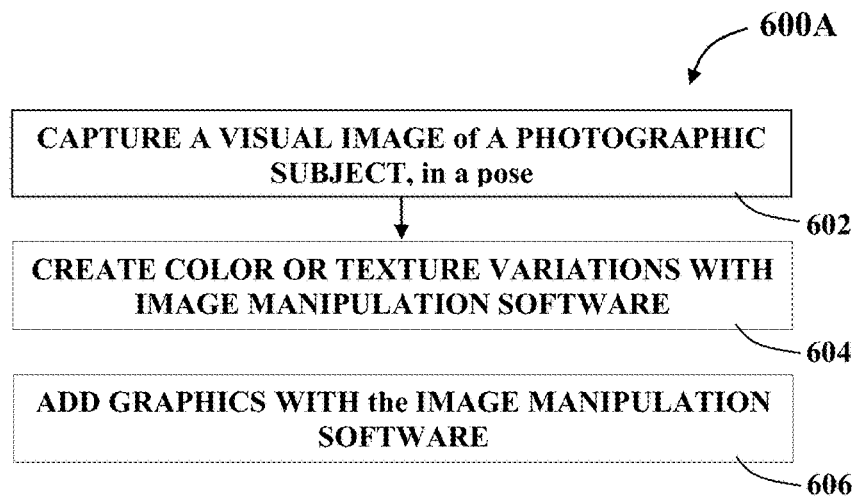
FIGS. 6A-D are flowcharts representing solution methods for generating photo-realistic quality images of virtual products.

As illustrated in the flowchart of FIG. 6A, there is provided one solution method, which is generally indicated at 600A, for generating photo-realistic quality images of virtual products.

Step 602 of the method 600A involves capturing a visual image of a photographic subject in a pose, such as a fashion model for example;

Step 604 involves adding colors and textures variations to the visual image, using image manipulation software; and further Step 606 involves adding graphics to the visual image using the image manipulation software.

It is noted that such a solution may be limited since the branding agent may require capturing a photograph for each pose or style of the photographic subject.

Figure 6B:
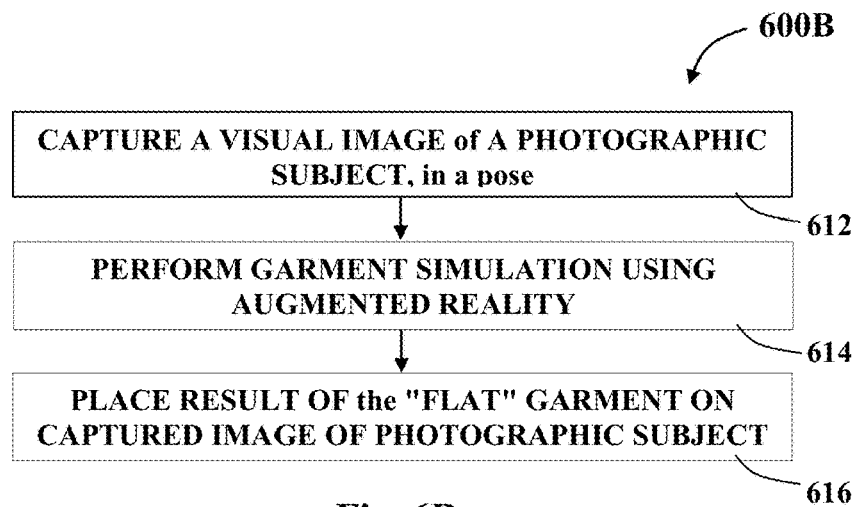

As illustrated in the flowchart of FIG. 6B, there is provided another solution method, which is generally indicated at 600B, for generating photo-realistic quality images of virtual products.

Step 612 of the method 600B involves capturing a visual image of the photographic subject in a pose, such as a fashion model;

Step 614 involves performing virtual garment simulation using augmented reality; and Step 616 involves placing the virtual garment simulation result, usually a "flat" virtual garment, on the captured visual image of the photographic subject, such as fashion model, for example.

It is noted that such a solution may not provide the quality required by the branding agent as a true representation of a desired product.

Figure 6C:
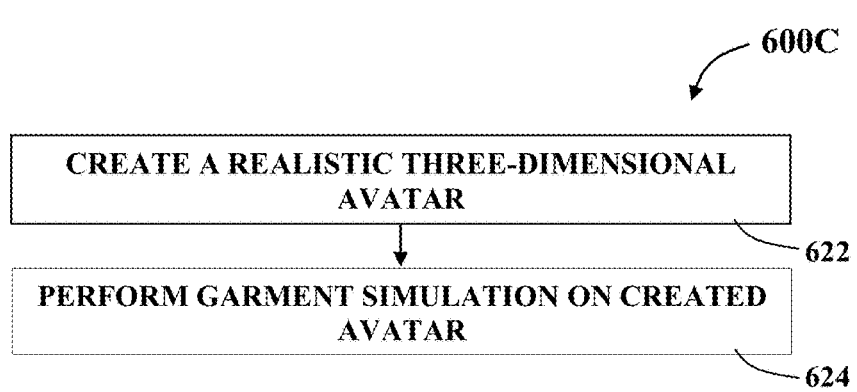

As illustrated in the flowchart of FIG. 6C, there is provided yet another solution method, which is generally indicated at 600C, for generating of photo-realistic quality images of virtual products.

Step 622 of the method 600C involves creating a realistic three-dimensional avatar representing the photographic subject; and Step 624 involves performing garment simulation on the created three-dimensional avatar.

It is noted that the solution as described in the method of FIG. 6C, may provide an advantageous approach since the three-dimensional avatar may be positioned in various poses. Yet, the result is only as good as the realism of the three-dimensional avatar which may not provide a sufficient solution, mainly as generating a three-dimensional avatar with look of a real person is not a realistic. Thus, such a solution may be limited from the perspective of a branding agent, wanting the shoppers to relate to a real person that they can identify with.

Accordingly, the present disclosure provides a system and methods allowing the branding agent to use virtual products combined with captured images of a real photographic subject.

Figure 6D:
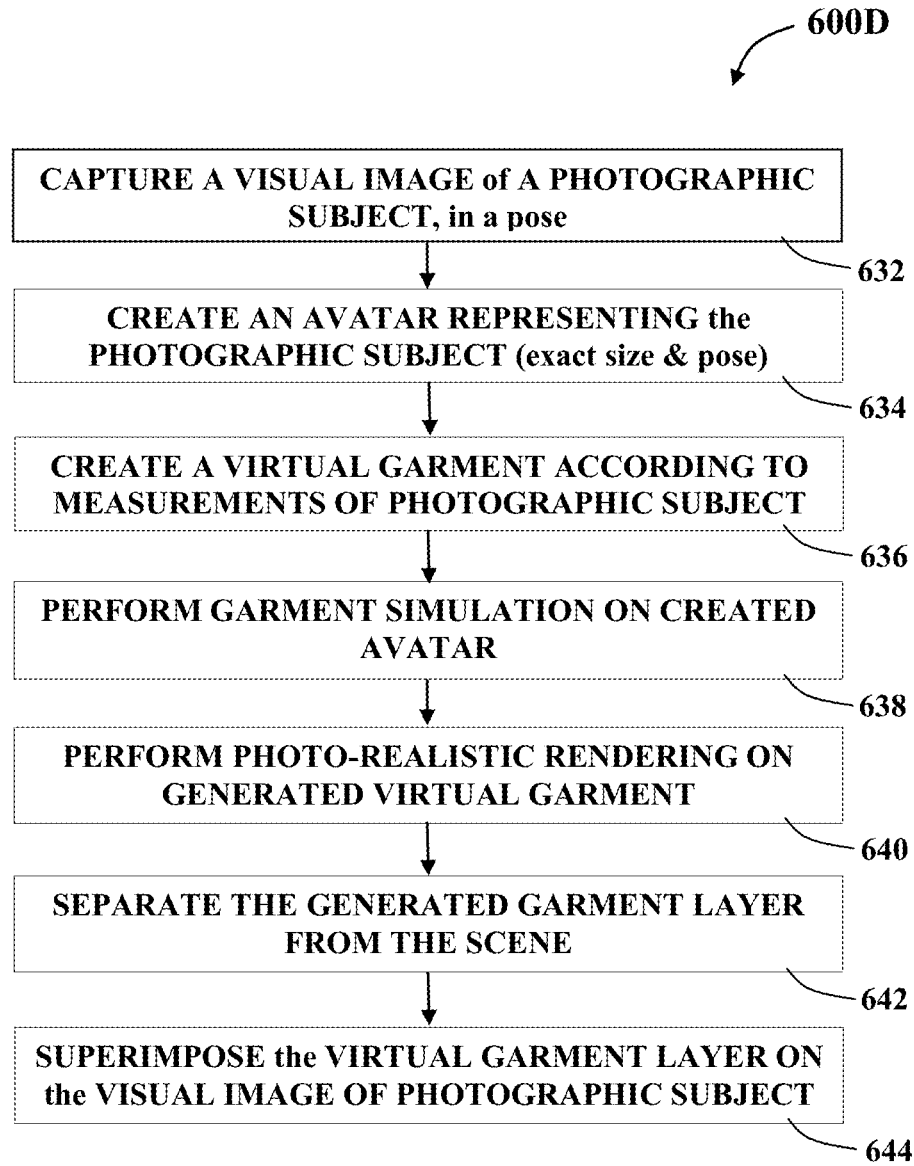

As illustrated in the flowchart of FIG. 6D, there is provided an additional solution method, which is generally indicated at 600D, for generating of photo-realistic quality images of virtual products.

Step 632 of the method 600D involves capturing a visual image (still picture or video session) of the photographic subject, such as a fashion model in a pose, the photographic subject, in a particular embodiment with the specific case of a fashion model, may be in underwear or with tight cloths;

Step 634 involves creating a three-dimensional avatar representing the photographic subject according to the captured visual image;

Step 636 involves creating a virtual garment according to measurements of the photographic subject;

Step 638 involves performing garment simulation dressing the three-dimensional avatar representing the captured visual image of the photographic subject, say the fashion model in an exact pose and size;

Step 640 involves performing a process of photo-realistic rendering on the generated virtual garment;

Step 642 involves separating the virtual garment layer from the scene; and

Step 644 involves superimposing the virtual garment layer onto the captured image.

Still Images:

For illustrative purposes only, a first embodiment of the system includes a making process of static images is described below. The initial setup method may be repeated for every photographic subject associated with a combination of the environment, the specific subject and the associated pose. For example, if shooting an outdoor and indoor scene, with three fashion models, each associated with two poses, a total of 2*3*2=12 setups may need to take place.

Initial Setup for Still Images

Figure 7A:
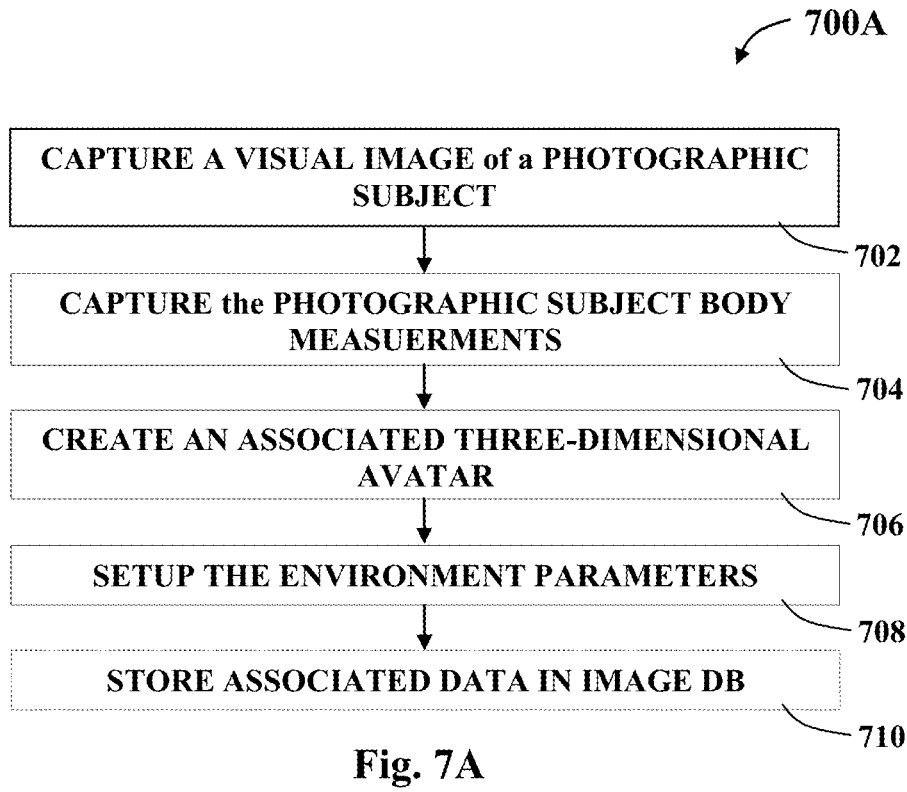
FIG. 7A is a flowchart representing a method for performing initial setup for the virtual photoshoot process.

As illustrated in the flowchart of FIG. 7A, there is provided a method, which is generally indicated at 700A, for performing initial setup for the virtual photoshoot process.

Step 702 of the method 700A involves capturing at least one visual image associated with a photographic subject according to requirements. Meeting the image capturing associated parameters is important to achieve a photo-realistic quality of the superimposed image and may require matching the pose and environment conditions, particularly light control, during the image processing.

As appropriate, the image capturing session may require accurate measurements of camera position, exact match between the photograph and the three dimensional scanning. Further, with regard to video and animation, exact match between video and motion capturing is essential.

Step 704 involves capturing measurements of the photographic subject to further enable generating of the associated three-dimensional avatar. There are various possible methods operable to generate the three-dimensional avatar associated with the photographic subject. One such possible method may use three-dimensional scanning and the point cloud of the three-dimensional scan output may be used to create the matching three-dimensional avatar of the photographic subject, using various automated solutions operable to read the output of the three-dimensional scan and generate the desired three-dimensional avatar. Additionally or alternatively, photographic subject body measurements may be measured, and then applied to a parametric three-dimensional avatar. It is noted that the amount of measurements may affect the accuracy of the generation of the three-dimensional avatar. Additionally, if this parametric method is used, the body posture must also be applied to the parametric three-dimensional avatar.

Variously, any such method may be used, yet the three-dimensional scan may be more accurate, if using high end equipment.

In step 706, the associated three-dimensional avatar is created according to the original captured image parameters of the photographic subject. Accordingly, the three-dimensional avatar may use various technologies to answer different needs. The three-dimensional avatar may be created by model, using rigging technology or using positioning points.

Creating the three-dimensional avatar, by model, implies using any of the previously mentioned methods of three-dimensional scanning coupled with automatic solutions, capturing of photographic subject measurements to use parametric definitions and the like. It is noted that the model creation enables creating the three-dimensional avatar with the exact pose of the photographic subject of the original captured image.

Further, rigging technology may be applied to creation of three-dimensional avatars associated with static images and operable to create multiple avatars of the same photographic subject, each with a different pose, for example. A rig is a skeleton of joints that may be pragmatic to a three-dimensional avatar and may be used to apply animation sequences associated with the three-dimensional avatar.

Additionally, three positioning points that are not on the same plane may be used and should be marked on the three-dimensional avatar measured in distance related to (0,0,0) of the three-dimensional avatar.

Step 708 involves setting the environment parameters, particularly associated with lighting and background image of the original captured image.

Step 710 involves, optionally, storing the captured parameters in an image repository operable to provide the image and associated setup data for futuristic superimposed image creation.

Figure 7B:
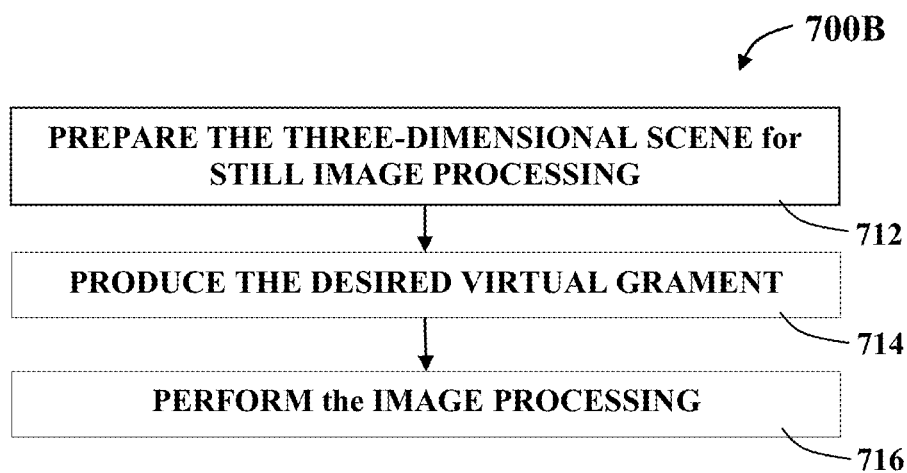
FIG. 7B is a flowchart representing a method for making superimposed realistic quality images using virtually drape clothing on three-dimensional avatars.

Still Image Making:

As illustrated in the flowchart of FIG. 7B, there is provided a method, which is generally indicated at 700B, for making superimposed realistic quality images using virtually drape clothing on three-dimensional avatars.

In step 712, the three-dimensional scene is prepared to facilitate matching between the photographic subject and the three-dimensional scene. As appropriate, choosing the background image, thus defining the environment combinations with the photographic subject pose; loading the three-dimensional environment triggered automatically by the software upon background image selection by the user; and loading the avatar representing the photographic subject in a pose, automatically triggered upon background image selection.

Step 714 involves making the desired virtual garment to facilitate the static image processing and further create the realistic quality image. As appropriate, creating/loading existing two-dimensional patterns that represent the garment prepared; performing "virtual stitching" on selected patterns; positioning the patterns next to the avatar in the three-dimensional scene; setting the garment parameters based on the fabric used; and performing garment simulation.

In step 716, static image processing is performed. As appropriate, grabbing the visible portion of the garment (the portion of the garment which is not obstructed by the three-dimensional avatar), performed algorithmically via the processing software; sending the garment frame to photo-realistic rendering by integrating various software and renderers.

It is noted that this step requires preparation of garment shaders (texture, bmp map, reflection map and the like) in advance for every fabric being used.

Further, creating a visibility mask from the garment frame, a new capability introduced into the software, where the mask edges need to be anti-aliased; and superimposing the rendering result through the mask onto the original photographic subject image. The superimposing is performed using a new capability introduced into the software. Furthermore, the positioning may be automated using 2-3 positioning points which are marked during the setup process, and then matched when the simulation takes place.

Video/Animation Sequence:

For illustrative purposes only, a second embodiment of the system which may include a production process involving producing animations and video sequences is outlined below. The process for creating video sequences may share many common features with the process for creating static images described hereinabove. It is therefore described below in high level, and only differences or additions from the static image process will be detailed.

Figure 8A:
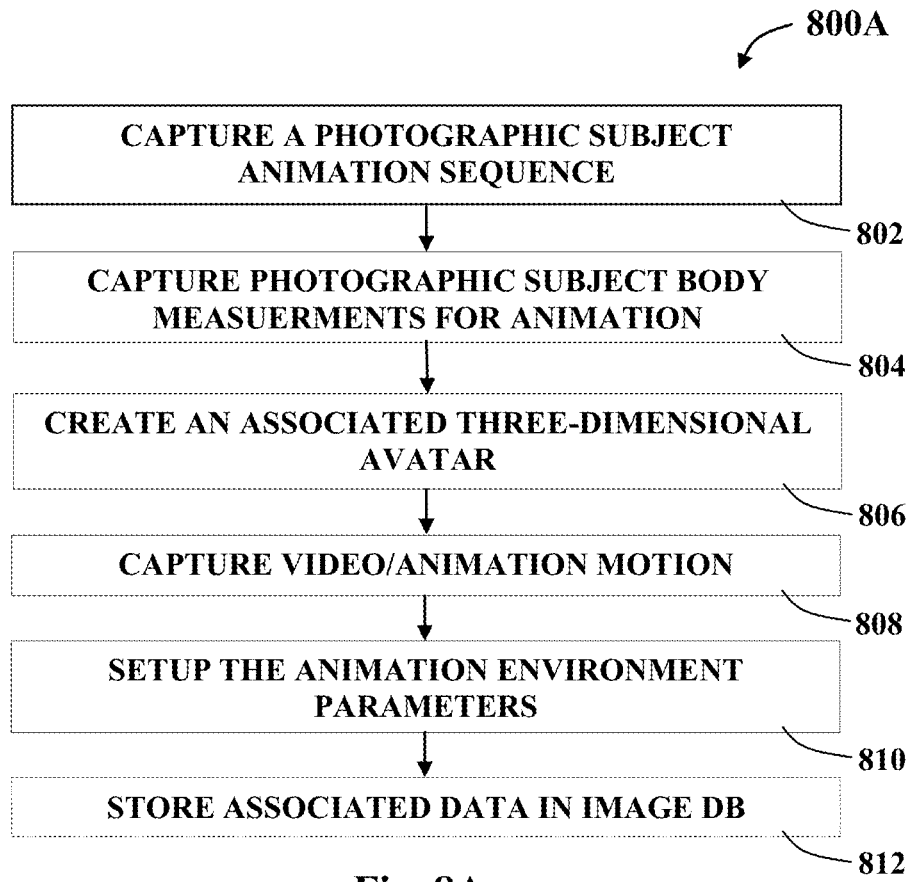
FIG. 8A is a flowchart representing a method for performing initial setup for virtual photoshoot of video and animation sequence.

Initial Setup for Video Sequence:

As illustrated in the flowchart of FIG. 8A, there is provided a method, which is generally indicated at 800A, for performing initial setup for virtual photoshoot of video and animation sequence.

Step 802 involves capturing at least one video and animation sequence associated with a photographic subject according to requirements. Meeting the video sequence capturing associated parameters is important to achieve a photo-realistic quality of the superimposed video sequence and may require matching the pose and environment conditions, particularly light control, during the image processing.

Step 804 involves capturing the measurements of the photographic subject to further enable generating the associated three-dimensional avatar. This step is similar to step 704 (FIG. 7A), and is associated with applying three-dimensional scanning using the point cloud of the three-dimensional scan output to create a matching three-dimensional avatar of the photographic subject. The point output of the scan may be used as input to various automated solutions which are operable to read the output of the three-dimensional scan and generate the three-dimensional avatar. Additionally or alternatively, photographic subject body measurements may be measured, and then applied to a parametric three-dimensional avatar.

In step 806, motion capturing of the video/animation sequence may be filmed using motion capture technology. Such technology allows translating the body movements into a three-dimensional animation sequence.

In step 808, creating the associated three-dimensional avatar according to the original captured image parameters of the photographic subject, is similar to step 706 of the method described in FIG. 7A, with an exception. The exception is associated with using rigging technology, as a binding step when creating video/animation sequences.

In step 810, setting the environment parameters is similar to step 708 of the method described in FIG. 7A, particularly associated with lighting and background image of the original captured image.

In step 812, optionally, storing the captured parameters and video sequence in an image repository is similar to step 708 of the method described in FIG. 7A, and further operable to provide the image/video sequence and associated setup data for futuristic superimposed image/video creation.

Video Image Sequence Processing:

For illustrative purposes only, a second embodiment of the system which may include a production process involving making animations and video sequences is described below. The process for creating video sequences may share common features with the process for creating static images described hereinabove. It is therefore described mainly emphasizing the changes between the two making processes. The process may be repeated for every environment-photographic subject-animation sequence combination, which may be required. For example, if shooting an outdoor and indoor scene, with three fashion models, each with three animations—a total of 2*3*3=18 setups are needed. An animation may be a "catwalk", a person walking, a person raising arms, dancing and the like.

Figure 8B:
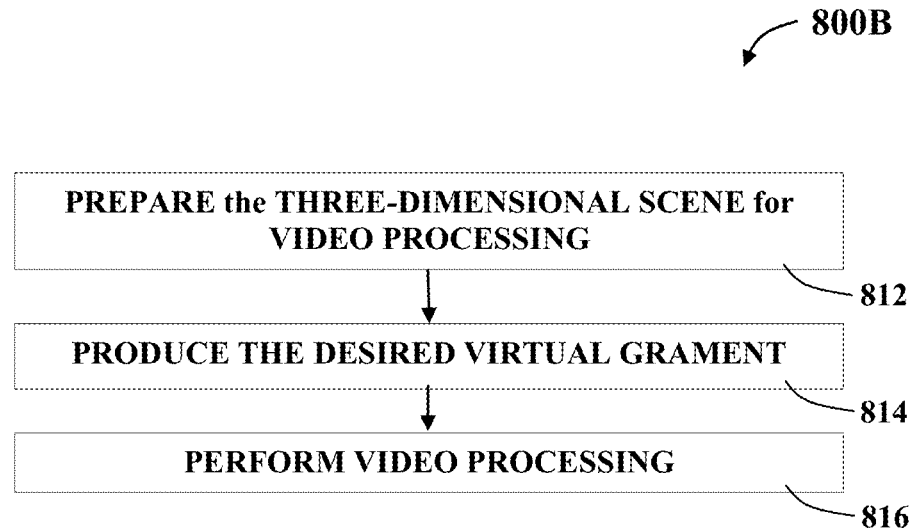
FIG. 8B is a flowchart representing a method for making superimposed realistic quality video animation sequences using virtually drape garment on three-dimensional avatars.

As illustrated in the flowchart of FIG. 8B, there is provided a method, which is generally indicated at 800B, for making superimposed realistic quality video animation sequences using virtually drape garment on three-dimensional avatars.

In step 812, the three-dimensional scene is prepared to facilitate matching between the video sequence of the photographic subject and the three-dimensional scene. As appropriate, choosing the desired video sequence defining the environment combination with the photographic subject animation sequence; loading the three-dimensional environment triggered automatically by the software upon background image selection by the user; loading the avatar representing the photographic subject in a pose, automatically triggered upon background image selection; and loading the animation sequence, automatically upon selection of the desired video.

In step 814, the desired virtual garment is made to facilitate the video sequence processing. This step is similar to step 714 of the method described in FIG. 7A, except that the garment simulation is happening on all frames of the animation sequence. If, for example, the animation is 10 sec long, running on 30 frames per second (fps), 300 video frames are generated and 300 simulations may take place. As appropriate, creating/loading existing two-dimensional patterns that represent the garment prepared; performing "virtual stitching" on selected patterns; positioning the patterns next to the avatar in the three-dimensional scene; setting the garment parameters based on the fabric used; and performing garment simulation, triggered automatically for all frames in the animation sequence.

In step 816, performing video processing, the video is prepared by repeating the process of image processing for every frame of the animation sequence. As appropriate, grabbing the visible portion of the garment; sending the garment frame to photo-realistic rendering; creating visibility mask from the garment; and superimposing the rendering result through the mask onto the original photographic subject-pose video frame.

Figure 9A:
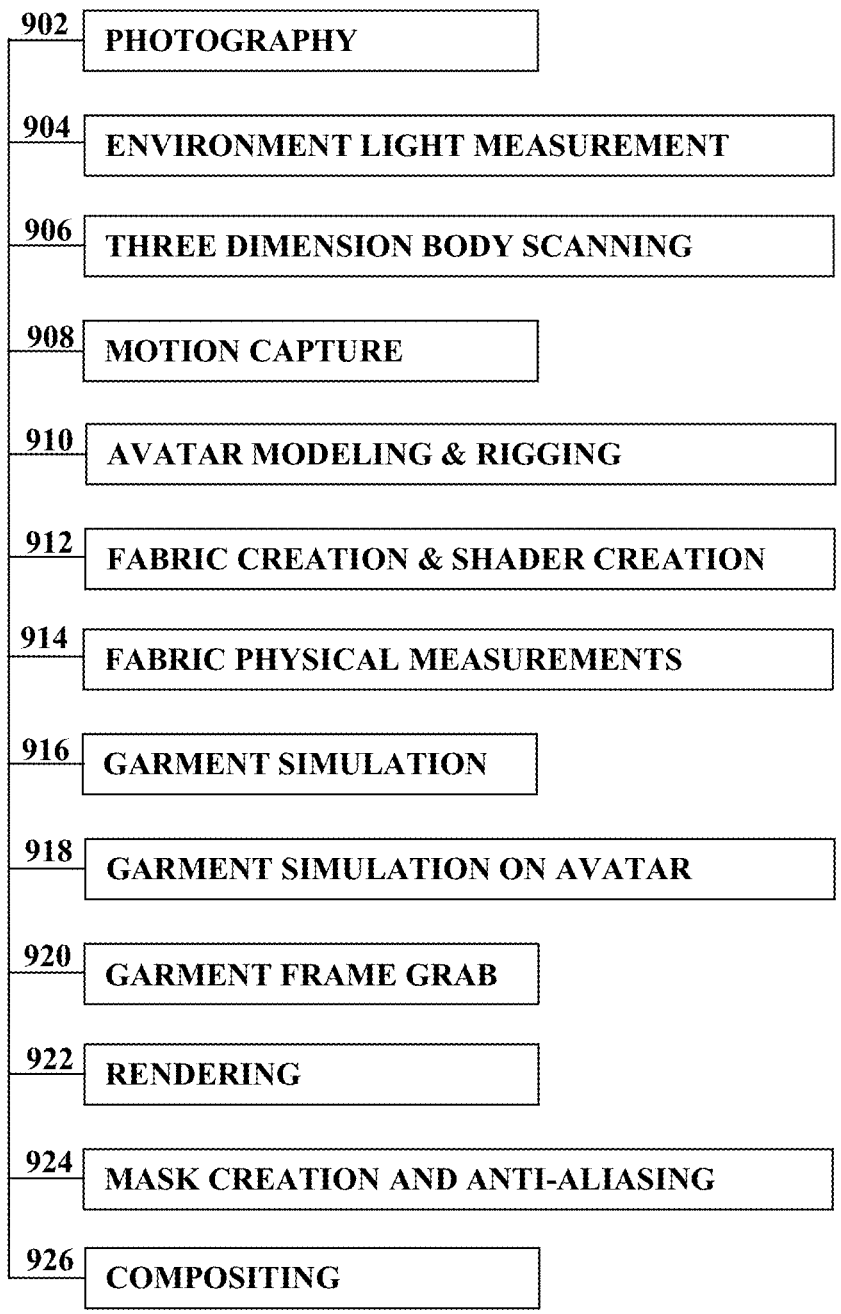
FIG. 9A is a list of technologies and tools automatically combined for generating high quality three-dimensional superimposed realistic visual images using virtual elements.

As illustrated in the FIG. 9A, there is provided a list, which is generally indicated at 900A, of technologies and tools automatically combined for generating high quality three-dimensional superimposed realistic visual images using virtual elements.

The technologies combined to form the automated system are associated with photography (902) of capturing still images, video session and possibly generating an animation sequence of a plurality of still images; light condition measurements (904) of the environment of the applicable scene; body measurements such as body scans of the associated photographic subject (906); motion capturing technology (908) used to digitally record movements of the photographic subject (human, objects), where the recorded motion capture data is mapped into a digital model enabling the digital character (avatar, for example) to move like the actor, fashion model and the like; avatar modeling technology associated with rigging (910) to enable the three-dimensional avatar to fit with any production environment; virtual fabric creation and shaders creation (912); fabric physical measurements (914) to provide the function of generating the virtual fabric; garment simulation (916) to demonstrate the created virtual garment and further garment simulation over a three-dimensional avatar (918); garment frame grabbing (920); rendering technology (922) applicable in three-dimensional graphic design enabling the process of adding shading, color, laminations to a two-dimensional or three-dimensional wireframe (vector representation) in order to create true-to-life visual images such as still pictures or videos; mask creation and anti-aliasing (924); and compositing operable to use digital processing to superimpose one layer onto another layer of the original visual image.

Figure 9B:
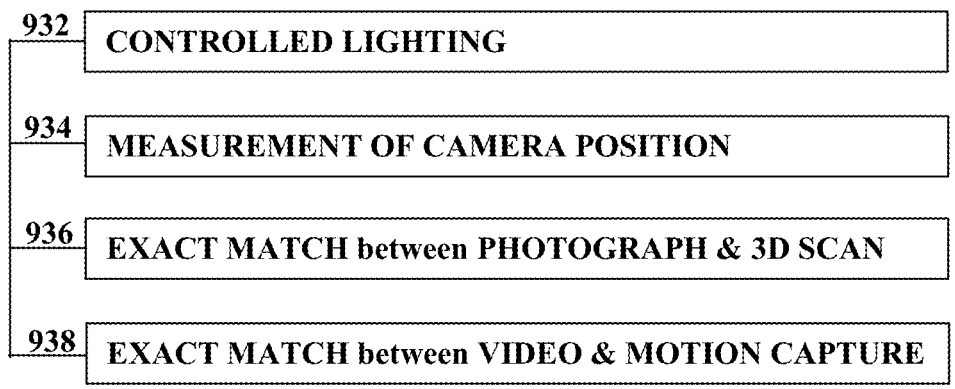
FIG. 9B is a list of technological setting requirements for obtaining high quality superimposed realistic images using virtual elements.

As illustrated in the FIG. 9B, there is provided a list, which is generally indicated at 900B, of technological setting requirements for obtaining high quality superimposed realistic images using virtual elements for facilitating the effectiveness of such a photo-shooting system.

The associated list 900B comprises controlling lighting (932) during the photography process; measurement and accuracy of camera positioning (934); exact matching between the visual image and the three-dimensional scan (936); and exact matching between video and motion capturing (938).

Reference Notes:

It should be appreciated to those skilled in the art that the invention may not be limited to the details of the foregoing illustrative embodiments and that the present invention may be use various other embodiments in other specific forms without departing from the nature or essential attributes thereof. The present embodiments are therefore to be considered in all respects as illustrative and not restrictive.

Those skilled in the art to which this invention pertains will readily appreciate that numerous changes, variations and modifications can be made without departing from the scope of the invention mutatis mutandis.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the disclosure.

The invention claimed is:

1. A method for generating a photo-realistic quality image of a virtual garment overlaid on a visual image of a photographic subject in a pose, said method comprising:
   capturing said visual image of the photographic subject, said visual image representing the photographic subject in said pose;
   creating a customizable avatar representing said photographic subject in said pose according to said visual image;
   making said virtual garment fitting said customizable avatar;
   generating an avatar anchoring set, said avatar anchoring set containing at least two positioning points selected from said visual image;
   generating a garment anchoring set, said garment anchoring set containing at least two positioning points selected from said virtual garment; and
   superimposing said virtual garment over said visual image using digital visual processing technique by matching corresponding positioning points from said avatar anchoring set and said garment anchoring set,
   wherein said visual image is selected from a group consisting of: a photographic picture, a video session comprising a plurality of photographic picture frames and combinations thereof.

2. The method of claim 1, wherein the step of creating a customizable avatar, comprises:
   capturing a plurality of body measurements of said photographic subject;
   applying a parametric avatar mechanism configured to read said plurality of body measurements; and
   creating said customizable avatar parametrically using said plurality of body measurements.

3. The method of claim 1, wherein the step of creating a customizable avatar, comprises:
   performing a three-dimensional scan operable to output a scanning result;
   applying a market automated solution configured to read said scanning result; and
   creating said customizable avatar.

4. The method of claim 1, wherein the step of creating a customizable avatar comprises:
   creating a plurality of customizable avatars, each said customizable avatar is associated with one of said plurality of photographic picture frames of said video session using rigging technology, said frame comprises one photographic picture.

5. The method of claim 4, wherein the step of creating a customizable avatar further comprises:
   said rigging technology being operable to provide a skeleton of joints applied to each said customizable avatar in each frame representing said photographic subject in a different pose.

6. The method of claim 1, further comprising:
   preparing an associated three-dimensional scene to facilitate matching with the visual image of the photographic subject.

7. The method of claim 6, wherein the step of preparing an associated three-dimensional scene, comprises:
   selecting a configurable environment to match the environment associated with the photographic picture, the environment characterized by a background image and lighting conditions;
   loading the configurable environment; and
   loading the customizable avatar representing the photographic subject in the pose as appearing in the visual image.

8. The method of claim 6, wherein the step of preparing an associated three-dimensional scene, comprises:
   selecting a configurable environment to match the environment associated with each photographic picture frames of the video session, and the environment characterized by a background image and lighting conditions;
   loading said plurality of photographic picture frames associated with said video session;
   loading the configurable environment; and
   loading the customizable avatar associated with each plurality of photographic picture frames of the video session.

9. The method of claim 8, wherein the step of loading is performed automatically upon selection of said video session.

10. The method of claim 1, wherein the step of making a virtual garment, comprises:
    loading at least one two-dimensional pattern representing the virtual garment being prepared;
    performing virtual stitching of the two-dimensional pattern into the virtual garment;
    positioning the two-dimensional patterns adjacent to the customizable avatar in the three-dimensional scene;
    setting the virtual garment parameters according to a selected fabric;
    selecting said at least two positioning points from said virtual garment to enable said step of superimposing; and
    performing garment simulation on the visual image associated with the photographic subject.

11. The method of claim 10, wherein the step of performing garment simulation is automatically triggered for each of a plurality of photographic picture frames associated with said video session.

12. The method of claim 1, wherein said digital visual processing technique is selected from a group consisting of image processing technique and video processing technique.

13. The method of claim 12, wherein said image processing technique, comprises:
grabbing the visible portion of the virtual garment;
performing photo-realistic rendering on the virtual garment;
creating a visibility mask associated with the virtual garment; and
superimposing the photo-realistic rendering result through the visibility mask onto the visual image of the photographic subject.

14. The method of claim 12, wherein said video processing technique is automatically repeating the image processing technique for each said plurality of photographic picture frames associated with said video session.

15. The method of claim 1, wherein said photographic subject is selected from a group consisting of: a fashion-model, a statue, a building, a mannequin, an inanimate object and combinations thereof.

16. The method of claim 1, the step of creating a customizable avatar, further comprising:
filming said video session of said photographic subject using motion capturing technology operable to determine photographic subject body movements; and
translating said photographic subject body movements into a three-dimensional animation sequence.

17. A pattern design system for generating a photo-realistic quality image of a virtual garment, the system comprising:

a processor operable to execute a software application for virtual garment design and operable to communicate with a repository comprising a plurality of visual images;
an avatar generator engine operable to generate a customizable avatar matching a photographic subject in a pose captured in said visual image;
a garment simulation engine operable to realistically represent fabric and to virtually drape said virtual garment on said customizable avatar; and
a compositing engine operable to enable superimposing said virtual garment over said visual image using a digital visual processing technique, and
wherein said visual image is selected from a group consisting of: a photographic picture, a video session comprising a plurality of photographic picture frames and combinations thereof.

18. The system of claim 17, wherein said digital visual processing technique is selected from a group comprising image processing technique, video processing technique and combinations thereof.

19. The system of claim 17, wherein said compositing engine is further operable to enable superimposing said virtual garment over said visual image by matching at least two corresponding positioning points from an avatar anchoring set and a garment anchoring set.

20. The system of claim 17, wherein said avatar generator engine is further operable to use a measurement technique applied to said photographic subject, said measurement technique selected from a group comprising a body measurements technique, a three-dimensional scanning technique and motion capturing technique.

* * * * *